(12) United States Patent
Bauer et al.

(10) Patent No.: US 11,146,787 B2
(45) Date of Patent: Oct. 12, 2021

(54) METHOD OF COMPRESSING IMAGE DATA

(71) Applicant: Arnold & Richter Cine Technik GmbH & Co. Betriebs KG, Munich (DE)

(72) Inventors: Florian Bauer, Friedberg (DE); Kevin Abraham, Munich (DE); Peter Geissler, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 139 days.

(21) Appl. No.: 16/568,705

(22) Filed: Sep. 12, 2019

(65) Prior Publication Data

US 2020/0084442 A1 Mar. 12, 2020

(30) Foreign Application Priority Data

Sep. 12, 2018 (DE) .......................... 102018122295.5

(51) Int. Cl.
*G06T 7/00* (2017.01)
*H04N 19/115* (2014.01)
(Continued)

(52) U.S. Cl.
CPC ........... *H04N 19/115* (2014.11); *H04N 19/13* (2014.11); *H04N 19/136* (2014.11); *H04N 19/182* (2014.11)

(58) Field of Classification Search
CPC .. H04N 19/182; H04N 19/186; H04N 19/593; H04N 19/61; H04N 19/105; G06T 9/00
See application file for complete search history.

(56) References Cited

U.S. PATENT DOCUMENTS 4,984,076 A 1/1991 Watanabe et al.
5,764,374 A 6/1998 Seroussi et al.
(Continued)

FOREIGN PATENT DOCUMENTS

EP 1 467 570 A1 10/2004

OTHER PUBLICATIONS

German Search Report dated May 16, 2019 in connection with German Patent Application No. 10 2018 122 295.5.
(Continued)

*Primary Examiner* — Li Liu
(74) *Attorney, Agent, or Firm* — Amster, Rothstein & Ebenstein LLP (57) ABSTRACT

A method of compressing image data that comprise a plurality of pixel values that are associated with a respective pixel is described, wherein the pixel values are compressed for at least some pixels in accordance with the following steps: associating the respective pixel with one of a plurality of pixel groups in accordance with a predetermined grouping scheme, with each of the plurality of pixel groups being defined by the pixels of a plurality of predetermined pixel alignments or by a subset of pixels of a plurality of predetermined pixel alignments; determining an estimated pixel value of the respective pixel in dependence on the pixel value of at least one predetermined other pixel while using at least one estimation rule, with the at least one predetermined other pixel being selected in dependence on the pixel group of the respective pixel; forming a difference value of the respective pixel that corresponds to a predetermined relation between the pixel value and the estimated pixel value of the respective pixel; and encoding the difference value using an encoding method.

28 Claims, 4 Drawing Sheets

(51) Int. Cl.
    *H04N 19/182*     (2014.01)
    *H04N 19/136*     (2014.01)
    *H04N 19/13*     (2014.01)

(56) References Cited

U.S. PATENT DOCUMENTS

| | | | |
|---|---|---|---|
| 6,744,929 | B1 | 6/2004 | Okada |
| 8,929,672 | B2 | 1/2015 | Cieslinski et al. |
| 10,356,387 | B1 * | 7/2019 | Phillips ................ H04N 13/189 |
| 2003/0026335 | A1 * | 2/2003 | Thyagarajan ........ H04N 19/176 |
| | | | 375/240.2 |
| 2003/0039396 | A1 * | 2/2003 | Irvine .................... H04N 19/60 |
| | | | 382/233 |
| 2013/0011059 | A1 * | 1/2013 | Strom .................... H04N 19/14 |
| | | | 382/166 |
| 2015/0146975 | A1 * | 5/2015 | Romanovskiy ...... H04N 19/182 |
| | | | 382/166 |
| 2015/0319444 | A1 * | 11/2015 | Ando .................. H04N 19/176 |
| | | | 375/240.12 |
| 2017/0070750 | A1 | 3/2017 | Chen et al. |

OTHER PUBLICATIONS

Netravali, A. N., "Picture Coding—A Review," Proceedings of the IEEE, vol. 68, No. 3, Mar. 1980, pp. 366-407.

\* cited by examiner

METHOD OF COMPRESSING IMAGE DATA

The invention relates to a method of compressing image data which include a plurality of pixel values which are associated with a respective pixel.

Such image data are typically generated in an electronic camera, in particular in a digital motion picture camera (video camera), by means of an image sensor. The image sensor typically includes a plurality of light-sensitive sensor elements which are arranged in rows and columns and correspond to a respective pixel (picture element). The sensor elements generate electric signals in dependence on the incident light which correspond to a respective brightness value. The sensor elements can be provided with a pattern of color filters so that each brightness value is associated with a color channel, in particular red, green and blue. For this purpose, the so-called Bayer pattern is known in which a red filter element, two green filter elements and a blue filter element are respectively provided in a regular arrangement. However, monochrome image sensors and image sensors having differently formed pixels can generally also be considered, in particular sensors having a plurality of color channels, e.g. RGB-W sensors or RGB-IR sensors.

The volume of the image data has substantially increased in modern camera as the spatial resolution has increased, i.e. as the number of pixels per image has increased. Compression methods are therefore used to compress the image data generated in the camera and to write them to a memory of the camera or to output them to an external memory in compressed form. The compressed image data can be decompressed again later. Lossless and lossy compression methods are known for this. An image data compression is based, like every application of data compression, on either changing the original data, i.e. the pixel values, into a completely reconstructable form that requires less memory space (lossless) or changing them into a partly reconstructable form that admittedly likewise requires little memory space, but does not include all the data (lossy). In lossy compression, data are therefore removed; however, their loss should be practically not perceptible. An image data compression can in particular comprise a prediction method and an entropy encoding. In addition, preprocessing steps can be provided that can in particular be lossy and can thus overall provide a lossy compression (even if said combination of the prediction method and of the entropy encoding is lossless).

It is furthermore known to transform the image data in the frequency space (e.g. by discrete cosine transformation in accordance with JPEG or with the aid of wavelets in accordance with JPEG 2000), with the representation in the frequency space taking place by coefficients which each describe the amplitude of specific frequencies. To compress the data, these coefficients are quantized in dependence on the frequency, with the coefficients corresponding to the high frequencies being transmitted imprecisely or being discarded. Fine and radio frequency structures are hereby removed. Images compressed in this manner therefore frequently have a very smooth, washed-out and slightly blurred image impression. The image errors which arise in the compression are difficult to predict and are moreover not restricted to individual pixels, but rather occur as additional structures (so-called artifacts). In addition, the transformation into the frequency space is associated with a high calculation effort so that fast implementations such as are required for motion picture cameras are associated with a correspondingly high technical effort.

It is an object of the invention to provide a faster compression method which achieves a good quality of the decompressed images and avoids the formation of artifacts with a high compression factor. The compression method should preferably also be lossless.

This object is satisfied by a method having the features of claim 1.

The method described in the following is suitable for compressing image data that comprise a plurality of pixel values that are associated with a respective pixel of a plurality of pixels. The pixels are here provided in an arrangement of rows and columns, with each row or column corresponding to a pixel alignment having a predetermined order of pixels. A pixel alignment can be called a linear pixel group, i.e. a (linear) arrangement of pixels along a line. Modern digital image sensors typically have pixels in an arrangement of rows and columns. The image data to be compressed by the method described here can thus in particular be generated by a modern image sensor.

The method provides that the pixel value are compressed for at least some pixels in accordance with the following steps:

associating the respective pixel with one of a plurality of pixel groups in accordance with a predetermined grouping scheme, with each of the plurality of pixel groups being defined by the pixels of a plurality of predetermined pixel alignments or by a subset of pixels of a plurality of predetermined pixel alignments;

determining an estimated pixel value of the respective pixel in dependence on the pixel value of at least one predetermined other pixel while using at least one estimation rule, with the at least one predetermined other pixel being selected in dependence on the pixel group of the respective pixel;

forming a difference value of the respective pixel that corresponds to a predetermined relation between the pixel value and the estimated pixel value of the respective pixel; and encoding the difference value using an encoding method.

In summary, the pixel values are first converted into difference values in dependence on a respective group affiliation of the respective pixel, said different values then each being encoded. The compression of the pixel values thus takes place in dependence on a respective pixel group. Each pixel group is defined on the basis of a plurality of predetermined pixel alignments, i.e. a pixel group is supported on the specified arrangement in pixel alignments. A pixel group can in this respect comprise at least some, i.e. a subset, of the pixels of the respective pixel alignments (particularly including at least some pixels of each of the plurality of predetermined pixel alignments). The pixel group can thus be a predetermined selection of pixels from a plurality of predetermined pixel alignments, i.e. the pixel group can be composed of predetermined pixels that originate from a plurality of pixel alignments. The grouping scheme used for the association of a respective pixel can comprise for every pixel group position information of those pixels that belong to the respective pixel group. In accordance with the grouping scheme, a respective pixel can be associated with that pixel group that has the position information (e.g. a column and line index) of the respective pixel.

The grouping of the pixels on the basis of pixel alignments and their processing in dependence on the groups permit a substantial acceleration of the compression process, in particular, but not exclusively, on the use of graphics processors that are particularly suitable for the fast parallel processing of data. On the other hand, the method also permits a significant reduction of the noise associated with the determining of the estimated pixel value, whereby the encoding can take place more efficiently, as will be explained in even more detail in the following. The method is based on the recognition that the pixel values can by all means differ from one another in a systematic manner and that these differences can also be used systematically at least in the determination of the estimated pixel values to make the compression of the image data more efficient. The differences between the pixel values are advantageously already utilized in the course of determining the estimated pixel values. The subsequent encoding likewise profits from this in the sense of increased efficiency.

The determining of the estimated pixel values preferably takes place by a so-called prediction process in which a respective pixel value is e.g. estimated or predicted (estimation rule) by a weighted linear combination (or by a non-linear combination) of predetermined other pixel values. The difference values thus correspond to an estimation error or prediction error that as a rule is considerably smaller than the underlying pixel value. In comparison with the distribution of the pixel values, a displacement and/or a deformation of the distribution of the difference values toward lower values is/are hereby effected, i.e. the difference values are smaller from a statistical viewpoint than the underlying pixel values, with this effect being able to be independent of a formal value range. Due to the changed distribution, the difference values can advantageously be encoded binarily by a smaller number of bits (in particular by means of entropy encoding) so that the image data can be encoded overall and can hereby be compressed by a smaller number of bits.

The grouping scheme is preferably predetermined and ultimately defines which pixel or pixels is/are to be used for the estimate of the respective pixel. The grouping scheme defines a classification or subdivision of the pixels that has an effect on the determination of the estimated pixel values. The grouping scheme can in this respect be adapted to statistics or to another property of the pixels so that the pixels of a respective pixel group (or pixel class) can each be ideally estimated in the sense of a maximum efficiency of the compression method. In addition to statistics of the pixels, the position of the pixels to be used for the estimate can furthermore be taken into account in a manner such that the compression can take place particularly fast by parallel processing. The method thus has advantages in the sense of a high compression factor and a high achievable compression speed. At the same time, the method allows a lossless compression, with the formation of artifacts being avoided. In other words, the advantages of the method are not at the cost of the image quality of the reconstructed image data.

The at least one predetermined other pixel that is used for determining the estimated pixel value can always be selected the same for every pixel of a respective pixel group, or can be selected essentially the same for every pixel of a respective pixel group (with the exception e.g. of margins of the arrangement of rows and columns).

Within the present disclosure, the term "predetermined order" is generally to be understood as a defined order that can generally be selected as desired. This order can correspond to an ascending order of pixels in accordance with a pixel alignment. It can, however, also be defined in a completely different manner. The predetermined order can furthermore be defined by a "reading direction" of pixel values and/or by a uniform pixel index. The order can, however, also be fixed completely independently of a reading order or reading direction of pixel values.

All the pixel values of a respective image data set that can, for example, correspond to an individual image of an image sequence do not generally have to be compressed in accordance with the method in accordance with the invention, but the method in accordance with the invention can also only be carried out for some of the pixel values. The compression can, for example, be preceded by an analysis of the image data, with a first compression method (in particular the method in accordance with the invention) being used as the result of the analysis for some (variable or predetermined) image regions and with a second compression method differing from the first being used for other image regions, in particular to achieve a greater compression rate and/or a smaller memory requirement at the cost of a higher processing effort and/or a worse parallelizability.

The invention is generally also not restricted to a specific order of the compression of the pixel values or of the arrangement of the associated pixels.

It is also not precluded within the framework of the invention that preprocessing steps (e.g. quantization, linearization, gamma curve) are carried out after the generation of the original image data (for example by means of an image sensor) and before the compression of the pixel values.

Advantageous embodiments are disclosed in the dependent claims, in the description and in the Figures.

In accordance with an embodiment, the image data comprise pixel values of different colors, with the pixel value of the respective pixel and the pixel value of the at least one predetermined other pixel corresponding to the same color. In other words, only pixel values of the same color are used for the estimate of the respective pixel value. The compression is hereby easily parallelizable, on the one hand, e.g. if the image data were generated by an image sensor that has a plurality of color filters (e.g. a Bayer sensor). The pixel values furthermore differ between the colors with respect to their statistics (distribution of the pixel values). This can advantageously be taken into account by the grouping scheme in that each of the plurality of pixel groups respectively only has pixels of one color.

The plurality of pixel groups can comprise at least one first pixel group and one second pixel group, wherein, when the respective pixel is associated with the first pixel group, the respective pixel and the at least one predetermined other pixel can belong to the same pixel alignment. Furthermore, when the respective pixel is associated with the second pixel group, the determination of the estimated pixel value can take place in dependence on a plurality of predetermined other pixels that belong to the same pixel alignment as the respective pixel and/or to at least one other pixel alignment. Such a definition of the pixel groups in turn brings about advantages with respect to the efficient parallelizability. On the one hand, the pixels of the first pixel group are compressible independently of other pixel alignments. On the other hand, the pixels of the second pixel group are compressible in dependence on pixels of other pixel alignments, whereby in particular a more exact estimate of the pixel value can be achieved. The other pixels can in this respect advantageously belong to the first pixel group to increase the compression efficiency even further. The division of the pixels into the first and second pixel groups permits an ideal compromise to be achieved between the estimation accuracy and the compression speed.

The at least one other pixel alignment that includes at least one pixel for estimating the pixel value of the second pixel group can be directly adjacent or indirectly adjacent to the pixel alignment of the respective pixel. The at least one other pixel alignment can be spaced apart from the pixel alignment of the respective pixel, in particular by one pixel alignment, i.e. the other pixel alignment is a next but one pixel alignment and is thus indirectly adjacent to the pixel alignment of the respective pixel. Provision can be made that, when the respective pixel is associated with the second pixel group, the plurality of predetermined other pixels comprise at least one pixel that belongs to the same pixel alignment as the respective pixel and additionally comprise a plurality of pixels that belong to the next indirectly adjacent pixel alignments. This selection of pixels can be exclusive, i.e. the predetermined other pixels of another pixel alignment can exclusively originate from the indirectly adjacent pixel alignments that are spaced apart from the pixel alignment of the respective pixel by a maximum of one pixel alignment. Pixels from the directly adjacent pixel alignment can then e.g. be used for the estimation of pixel values whose pixels are admittedly in the same pixel alignment, but that belong to a different pixel group, in particular to the third pixel group named in the following.

In accordance with a further embodiment, the at least estimation rule provides the forming of a weighted sum on the basis of the pixel values of the plurality of predetermined other pixels when the respective pixel is associated with the second pixel group. In this respect, the pixel values are each provided with a weighting and are summed. The weightings can be different from one another and can be predetermined. The weightings can furthermore be fixed such that a noise portion contained in the pixel values (e.g. sensor noise) is reduced by the sum formation. For this purpose, the weighted sum can advantageously be formed by a mean value of the pixel values of the plurality of predetermined other pixels. It is preferred in this case if the weightings are formed by fractions whose sum corresponds to a predetermined value, in particular to the value one, independently of the number of weightings. Noise that e.g. approximately corresponds to a normal distribution or to a Gaussian distribution can be averaged out in this manner without the pixel values hereby being falsified. The estimation accuracy can hereby be effectively increased so that fewer bits have to be used overall for the encoding of a plurality of difference values.

In accordance with a further embodiment, the at least one estimation rule makes provision for the case of pixels of the first pixel group that the estimated pixel value is determined on the basis of a pixel value of a pixel whose position within the pixel alignment of the respective pixel is before the position of the respective pixel in accordance with the predetermined order. A particularly efficient implementation of the method is hereby made possible since the at least one predetermined other pixel is only in a direction relative to the respective pixel. In other words, the "predictor only has to look in one direction". It is furthermore preferred that, in the case of pixels of the first pixel group, only a single pixel is used for determining the estimated value since further pixels within the pixel alignment are already relatively far away from the respective pixel and can therefore not deliver any real contribution in specific cases. The determining of the estimated pixel value can furthermore take place particularly efficiently in that the pixel value of the single predetermined other pixel is used as the estimated value. A possible mean value formation as in the case of pixels of the second pixel group can thus be completely dispensed with in favor of a particularly efficient estimation.

The image data can comprise pixel values of a first color (e.g. red), pixel values of a second color (e.g. green), and pixel values of a third color (e.g. blue), with the number of pixel values of the second color being greater than the number of pixel values of the first color and greater than the number of pixel values of the third color for a respective image data set. Such an uneven numerical ratio is in particular present on a use of a Bayer sensor, with the number of green pixels being twice as high as the number of red and blue pixels. Other sensors are, however, also possible whose pixel values have different colors and different relationships between the respective pixel values.

In particular in the case of at least three different color channels, the plurality of pixel groups can comprise a third pixel group that is formed by a subset of pixels of the plurality of predetermined pixel alignments ("third group subset"), with the pixel values of the third pixel group comprising a first portion of the pixel values of the second color, and with the pixel values of the first pixel group and of the second pixel group comprising a second portion of the pixel values of the second color and pixel values of the first color and of the third color. In other words, the pixel values of a color whose number respectively exceeds the pixel values of the other colors can be divided over two pixel groups. The third pixel group can in particular only comprise pixel values of the second color. The division of the "excess" pixels can advantageously be used to increase the efficiency of the compression even further. The pixels of the third pixel group can thus, for example be distributed over the other pixel groups to reduce the noise and the other pixels of this color can be distributed over the other pixel groups in the sense of a fast compression speed.

If the respective pixel is associated with the third pixel group, the determination of the estimated pixel value is preferably carried out in dependence on a plurality of predetermined other pixels. These predetermined other pixels preferably belong, in particular exclusively, to at least one pixel alignment directly adjacent to the pixel alignment of the respective pixel. It is also possible in this respect that the plurality of predetermined other pixels comprise, in particular exclusively, pixels from the two directly adjacent pixel alignments. The at least one estimation rule can furthermore also provide the forming of a weighted sum on the basis of the pixel values of the plurality of predetermined other pixels in the case of pixels of the third pixel group. To reduce the noise, the weighted sum can be configured as a mean value in a similar manner or corresponding to the case of pixels of the second pixel group.

In accordance with a preferred embodiment, the predetermined pixel alignments of the first pixel group and of the second pixel group in the arrangement of pixels are defined alternatingly pairwise, i.e. two pixel alignments of the first pixel group are followed by two pixel alignments of the second pixel group, and vice versa. It is preferred in this respect that, when the respective pixel is associated with the second pixel group, the plurality of predetermined other pixels that belong to a different pixel alignment belong to the first pixel group, preferably exclusively. The determination of the estimated pixel value for pixels of the second pixel group can thus be restricted to pixels of the first pixel group with respect to pixels disposed outside the respective pixel alignment. In an advantageous implementation of the method, the pixels of the second pixel group and then the pixels of the first pixel group can then be at least partly compressed.

It is understood that adaptations can be carried out at the margins of the arrangement of rows and columns and said adaptations can in particular comprise a deviation from a regular grouping scheme. Provision can thus be made in a manner differing from the pairwise alternating grouping of pixel alignments that the last four pixel alignments do not comprise any pixels of the second pixel group. Furthermore, differing from the case that specific pixel alignments comprise pixels of the third pixel group, provision can be made that the last four pixel alignments do not comprise any pixels of the third pixel group and in particular only pixels of the first pixel group. Different or additional adaptations can also be provided.

If the respective pixel is associated with the second pixel group, it is possible that at least one of the plurality of predetermined other pixels belongs to the same pixel alignment as the respective pixel and has a position within the pixel alignment of the respective pixel that is disposed before the position of the respective pixel in accordance with the predetermined order.

The pixel values of pixels between different pixel alignments can be compressed at least partly in parallel to increase the compression efficiency. It is also possible to compress pixel values of pixels that belong to the same pixel alignment at least partly in parallel between the plurality of pixel groups. Furthermore, pixel values of pixels that belong to the same pixel group and to the same pixel alignment can be at least partly compressed in the ascending order of the pixel alignment. Furthermore, the pixel values of pixels of one of the plurality of pixel groups can be compressed before the pixel values of pixels of a different one of the plurality of pixel groups. For example, the pixel values of the first pixel group can advantageously be compressed after the pixel values of the second pixel group, in particular when pixel values of the first pixel group are admittedly used to determine the estimated pixels of the second pixel group, but not vice versa.

The pixels of the plurality of predetermined pixel alignments can be divided into a plurality of pixel strips transversely to the pixel alignments for a further increase of the compression efficiency, with the pixel values of pixels between the pixel strips being at least partly compressed in parallel. The number of "streams" to be carried out in parallel can hereby be increased so that the method can be carried out faster overall. The pixel strips preferably respectively comprise the same number of pixel alignments.

It is generally possible that the respective step of associating the respective pixel with one of a plurality of pixel groups is carried out in common for a plurality of the at least some pixels before the respective step of determining an estimated pixel value of the respective pixel is carried out for this plurality of pixels. Alternatively, the step of associating the respective pixel with one of a plurality of pixel groups can be carried out separately for each of the at least some pixels. It is also possible in this respect that the step of associating the respective pixel with one of a plurality of pixel groups is carried out simultaneously with the step of determining an estimated pixel value of the respective pixel. In other words, the step of associating can be integrated in the step of the estimation in a manner such that the predetermined pixels that are used for determining the estimated pixel value result directly from the position of the respective pixel. The group affiliation of the respective pixel can thus result directly from the position of the respective pixel. This does not, however, necessarily have to be the case. For example, the predetermined grouping scheme can comprise different criteria or additional criteria for the association of the pixels in a respective pixel group.

In accordance with a preferred embodiment, the plurality of predetermined pixel groups exclusively correspond to columns. This in turn brings about advantages with respect to the compression speed since frequently more columns than rows are provided. All the pixel groups are preferably supported on pixel alignments that correspond to columns.

Any desired encoding methods, in particular those of entropy encoding, can generally be used to encode the difference values. It has, however, been found that for the compression method described here, the difference values can particularly advantageously be encoded in accordance with a Golomb-Rice encoding process that per se belongs to general technical knowledge. A Golomb-Rice encoding process here provides a good compromise between the achievable speed and the average achievable compression factor.

Alternatively to a Golomb-Rice encoding process, an encoding process can in particular be used that is based on predetermined block lengths, i.e. a respective difference value that is represented by a first binary word having a variable length can be encoded by one or more second binary words that each have a predetermined and in particular fixed length. The compression method can thus be carried out particularly efficiently with respect to the encoding.

A Golomb-Rice encoding can preferably be configured such that a difference value to be encoded is divided by an encoding parameter to determine a whole number quotient and a remainder, wherein the remainder is represented by a first binary word and the whole number quotient is represented by a second binary word, with the first binary word and the second binary word being concatenated with one another. Provision can be made in this respect that, when a predetermined relation between the whole number quotient and the encoding parameter does not infringe a predetermined marginal condition, the concatenated binary word is concatenated with an encoding information bit to indicate the end of the concatenated binary word, with the concatenated binary word otherwise not being concatenated with the encoding information bit. The information is used in this respect that due to a predefined maximum number of bits to represent pixel values, the pixel values can only adopt values up to a maximum value. The estimation rule can equally be configured such that the difference values can also not be any larger than this maximum value. A maximum length results from this, i.e. a maximum number of bits of the concatenated binary word. If the concatenated binary word has the maximum length, the end of the binary word does not have to be indicated by an encoding information bit so that this encoding information bit can be saved in favor of a better compression rate.

The invention further relates to a computer program product comprising commands that on an execution of the program by a computer cause it to carry out the method in accordance with any one of the embodiments described here. The computer program product can comprise software or can be configured as software with the software being able to be firmware, i.e. embedded software.

A further subject matter of the invention is a computer readable storage medium comprising commands that on the execution by a computer cause it to carry out the method in accordance with any one of the embodiments described here.

The invention furthermore relates to an apparatus comprising the above-named computer readable storage medium and a computing device, wherein the computing device is adapted to carry out the commands stored on the storage medium. It is preferred for a particularly efficient carrying out of the commands that the computing device has at least one graphics processor and/or is connected to at least one graphics processor, in particular to carry out the commands or to operate the computing device in accordance with the commands. The commands can furthermore generally be implemented by a field programmable gate array (FPGA). It is, however, understood that the computing device does not necessarily have to have these means and that the method can also otherwise be efficiently carried out.

The apparatus can generally be configured for recording a time sequence of frames. The apparatus can in particular be a movie camera or a motion picture camera. The computing device of the apparatus is preferably configured to compress at least one of the frames in accordance with the above-described compression method. This can in particular also be advantageous on a movie camera, with the image data being able to be transmitted in compressed form. On the one hand, little bandwidth is in this respect required for the transmission (fast transmission), but, on the other hand, little memory space to store the image data is also required. For example, the compressed image data can be easily transmitted to a remote server on which a virtual cloud for image data has been installed. A compression or decompression is even possible in real time thanks to the methods described here so that e.g. frames can be compressed and transmitted to a remote location directly after their recording.

The method can generally also be implemented in further apparatus, e.g. in a digital microscope that can in particular be used in the medical field, for instance for carrying out operations.

The invention will be described in the following only by way of example with reference to the drawings, wherein.

In the following, elements that are the same or that correspond to one another are marked by the same reference numerals unless a special distinction is required between specific examples of elements.

Figure 1:
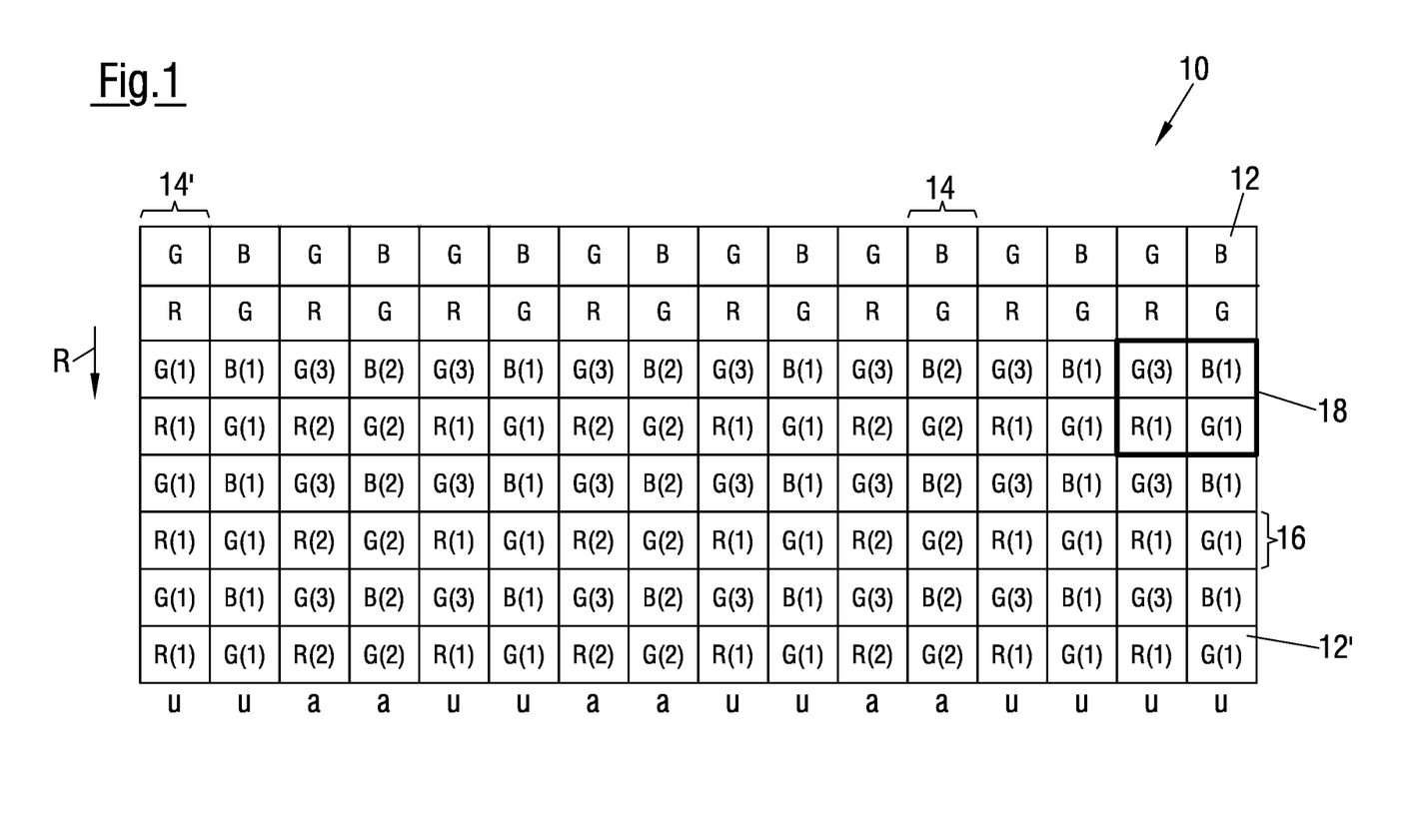
FIG. 1 shows a schematic pixel arrangement with pixels of three different colors, with each pixel being associated with one of three different pixel groups in accordance with a grouping scheme.

FIG. 1 shows an image data set 10 that comprises an arrangement of pixels 12 in a plurality of pixel alignments. Each row 16 and each column 14 corresponds to a pixel alignment, wherein the image data set 10 in FIG. 1 comprises eight rows 16 and sixteen columns 14. Each pixel alignment consists of a linear arrangement of pixels 12 in accordance with a predetermined order R, with this order R being entered for the columns 14 to the left of the image data set 10 in FIG. 1.

The pixels 12 of the image data set 10 comprise red pixels R, green pixels G, and blue pixels B that are arranged in accordance with the so-called Bayer pattern composed of blocks 18. Green pixels G are always present in every column 14, but additionally only either red or blue pixels. With the exception of the upper two rows 16, each pixel 12 is associated with one of three pixel groups (pixel 12') in accordance with a predetermined grouping scheme. The respective pixel group is indicated in brackets for every pixel 12', with e.g. G(1) meaning that the respective green pixel G is associated with the first pixel group. Accordingly, R(2) e.g. means that the respective red pixel R is associated with the second pixel group. It is thus also understood that G(3) e.g. means that the respective green pixel G is associated with the third pixel group. As can be recognized in FIG. 1, the grouping scheme provides that each pixel group comprises pixels 12' of predetermined columns 14. These predetermined columns 14 are defined alternatingly pairwise for the first two pixel groups. For illustration, those columns 14 that include pixels 12' of the first pixel group "(1)", but no pixels 12' of the second pixel group "(2)" are marked by "u", with these columns 14 being called independent columns u. In contrast to this, those columns 14 that include pixels 12' of the second pixel group "(2)", but no pixels 12' of the first pixel group "(1)" are marked by "a", with these columns 14 being called dependent columns a. The pairwise alternating arrangement of the dependent columns a and of the independent columns u can be easily recognized in FIG. 1, with an adaptation in the region of the outer right columns 14 to this extent comprising these two outer columns 14 being fixed as independent columns u. The affiliation of a pixel 12' to the respective column group (a or u) can generally be determined in dependence on a column index $$i=\{0,1,2,\ldots,16\}$$

in that the result of the operation i modulo 4 is compared to the value 2. If the result is smaller than 2, the pixel 12' is in a dependent column a, otherwise in an independent column u (exceptions in the outer right columns 14).

The green pixels G that belong to the third pixel group "(3)", i.e. the pixels G(3) are respectively defined independently of the division into dependent columns a and independent columns u by the upper green pixel G of a respective block 18 (cf. FIG. 1). There is also an exception in the outer left column 14' here where the respective green pixels G are associated with the first pixel group.

Figure 2:
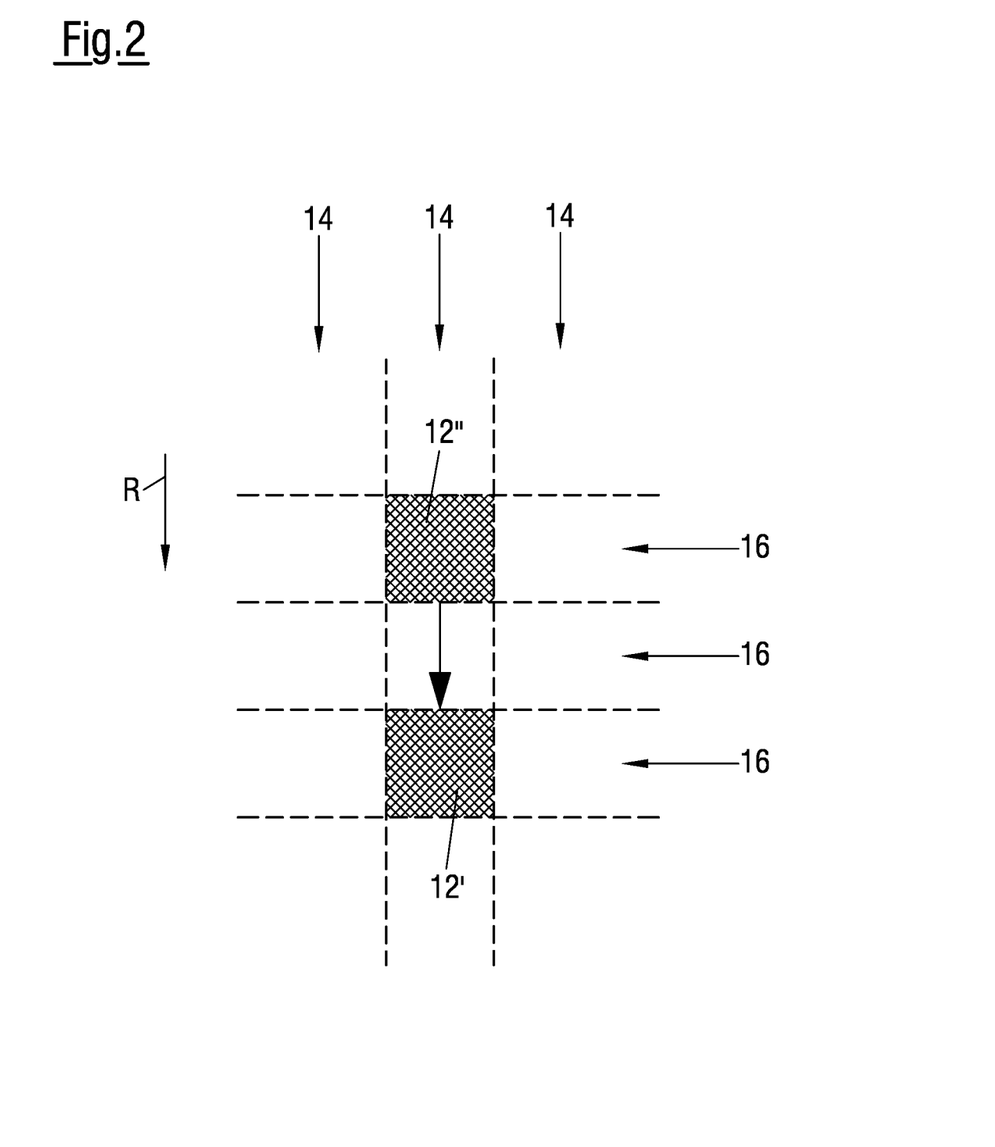
FIG. 2 illustrates a determining of an estimated pixel value of a pixel of a first pixel group.

Those pixels 12' are now compressed that are associated with a respective pixel group, that is all the rows 16 with the exception of the first two rows 16. For this purpose, an estimated pixel value is determined for a respective pixel 12', with the pixel value of at least one predetermined other pixel 12, 12' being used. For pixels 12' of the first pixel group (R(1), G(1), B(1)), the estimated pixel value corresponds to the pixel value of that pixel 12, 12' that is before the respective pixel 12' in accordance with the predetermined order R of the respective column 14 and has the same color. This is illustrated in FIG. 2, where a previous pixel 12" that is spaced apart from the respective pixel 12" by a row 16 or by a pixel is used for a respective pixel 12'. The respective pixel 12' can be any pixel 12' of FIG. 1 that is associated with the first pixel group "(1)". The estimated pixel value of the pixel 12' of FIG. 2 is therefore the pixel value of the pixel 12". A difference value is then formed between these pixel values that can be expressed by $$D1(X,Y)=W(X,Y)-W(X,Y-2),$$

where X is a row index and Y is a column index.

Figure 3:
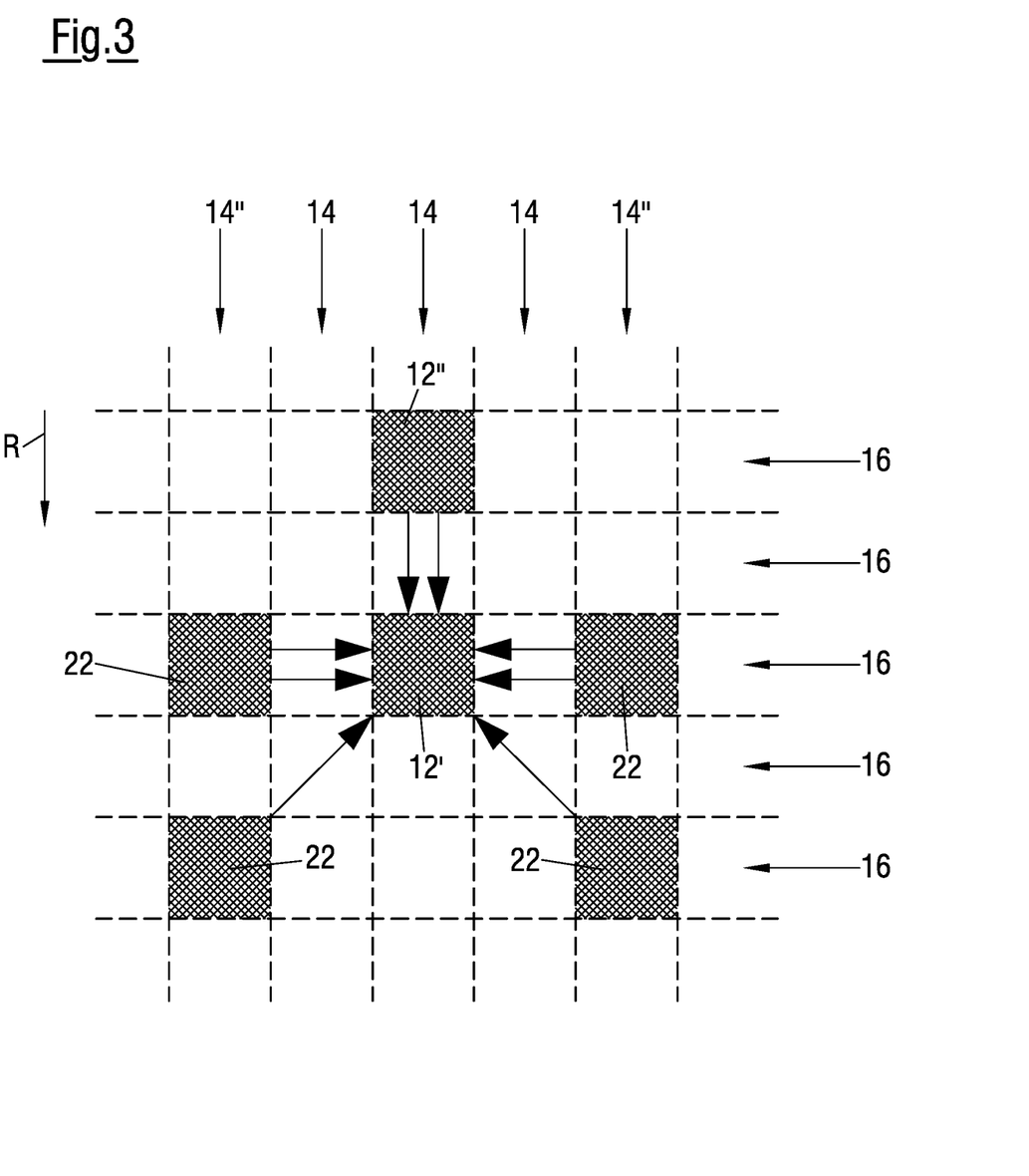
FIG. 3 illustrates a determining of an estimated pixel value of a pixel of a second pixel group.

Additional pixels are used to determine the estimated pixel value for pixels 12' that are associated with the second pixel group (R(2), G(2), B(2)). This is shown in FIG. 3. Starting from the respective pixel 12', on the one hand, the pixel 12" is used that is arranged in the same column 14 as the respective pixel 12' and, analogously to the case of FIG. 2, before the respective pixel 12' in accordance with the order R. On the other hand, two respective pixels 22 are used that are arranged in the two indirectly adjacent columns 14" and have the same color as the respective pixel 12' (cf. FIG. 1). The estimated pixel value of the respective pixel 12' is determined as the mean value of the pixel values of the pixels 12', 22. A difference value is then again formed between the pixel value of the respective pixel 12' and the predetermined other pixel 12", 22. The difference value can be expressed by:

$$D2(X,Y)=W(X,Y)-(2*W(X,Y-2)+2*W(X-2,Y)+2*W(X+2,Y)+W(X+2,Y+2)+W(X-2,Y-2))/8$$

"*" stands for a multiplication and "I" for a division here. It results from the formula for the difference value that the pixel values of the closer pixels in FIG. 3 (the upper three pixels 12", 22) are weighted more than the pixels diagonally remote and thus further remote (the lower two pixels 22). Sensor noise present in every pixel value is in particular reduced by the mean value formation.

Figure 4:
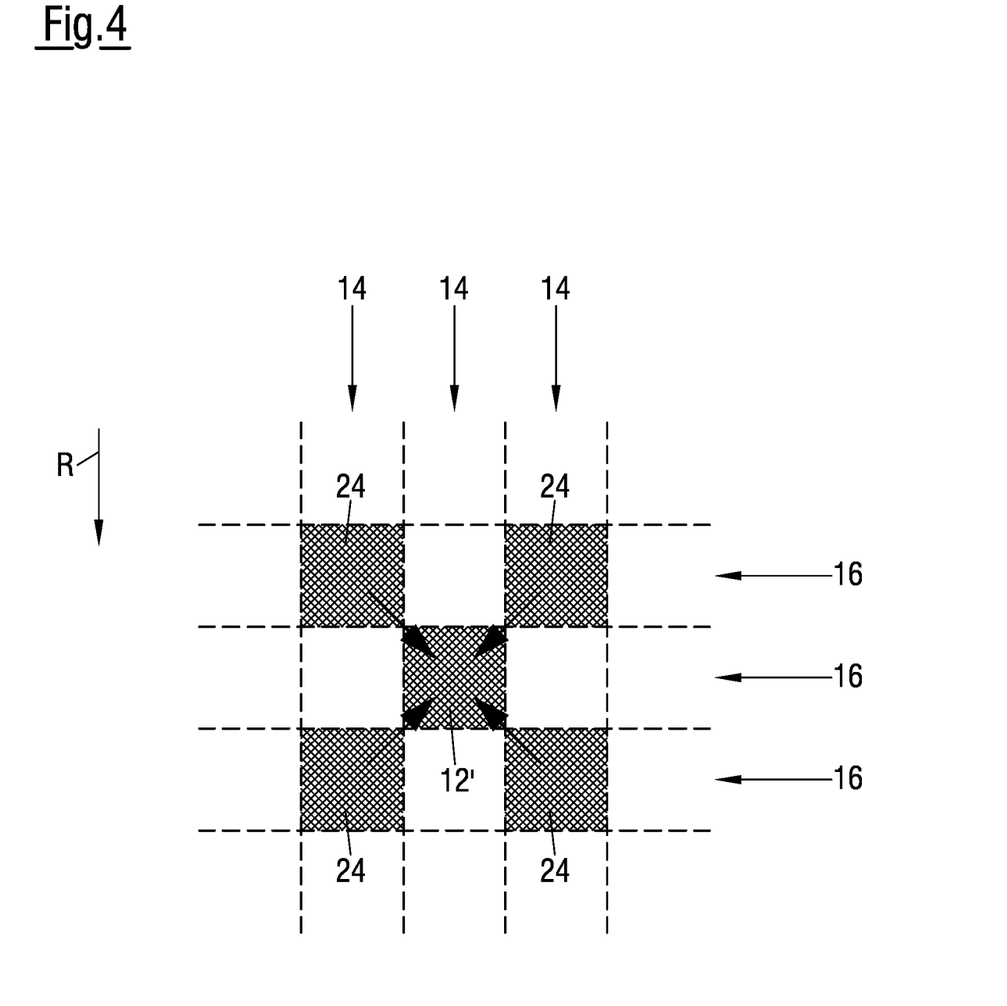
FIG. 4 illustrates a determining of an estimated pixel value of a pixel of a third pixel group.

For pixels 12' that are associated with the third pixel group (G(3)), the closest pixels 24 of the same color are used for determining the estimated pixel value that in the Bayer pattern of FIG. 1 are each located diagonally opposite in the two directly adjacent columns 14. This is shown in FIG. 4. The pixel values of these directly adjacent pixels 24 re in turn averaged to obtain the estimated pixel value of the respective pixel 12'. The difference value can be given for the respective pixel 12' by the formula:

$$D3(X,Y)=W(X,Y)-(W(X-1,Y-1)+W(X-1,Y+1)+W(X+1,Y-1)+W(X+1,Y+1))/4$$

The difference values can in particular also be negative. The difference value can be mapped to a value range that only has positive values (including zero) in accordance with a predetermined transformation rule before the encoding of a respective difference value. The transformation rule can be adapted for this purpose such that a respective negative difference value is mapped to odd values (e.g. by D*2−1). A respective positive difference value can in contrast be mapped to even values (e.g. by D*2).

In the following a Golomb-Rice encoding process will be described that can be used to encode a respective difference value D (in particular D1, D2, and D3). A predefined parameter k that can also be called a control parameter is used for the encoding. $A=D \% 2^k$ is first calculated for the encoding, where "%" stands for the modulo operation. A thus corresponds to a remainder that is represented by a first binary word having k bits. If the binary form of A comprises fewer than k bits, filling takes place with zero-value bits.

Furthermore $B=D/2^k$ is calculated as the whole number quotient (i.e. without a remainder), where B is represented by a second binary word that comprises a number of one-value bits that corresponds to the value B.

In the first example, a difference value D=61 with k=6 should be encoded that in binary form corresponds to the binary word 111101. The above-named calculations in this case have the result that A=61 and is represented by a first binary word 111101. The whole number quotient is here equal to zero (B=0) so that the second binary word does not comprise any bits. The first and second binary words are then formally concatenated with one another and with a zero value encoding information bit so that the following binary word results: 1111010.

In a second example, a difference value D=133 with k=6 should be encoded that in binary form corresponds to the binary word 10000101. In this case, A=5 so that the first binary word is 000101. Furthermore, B=2 so that 000101110 results as the concatenated binary word including the encoding information bit.

The pixel values of the image data and the difference values can be restricted to values between 0 and a predetermined maximum value MAXVAL. In dependence on the parameter k, a marginal condition can thus be defined such that $(B+1)*2^k$ is generally smaller than MAXVAL. If $(B+1)*2^k$ is greater than or equal to MAXVAL, it implicitly results that the respective concatenated binary word has to end and the encoding information bit can be dispensed with. In a further example, with k=10, D=3643, it results that A=571 and the first binary word is accordingly 111000111011, where B=3. The concatenated binary word is then 1000111011111.

The respective concatenated binary words can each be written to a bitstream that together with a header file represents compressed image data.

REFERENCE NUMERAL LIST 10 image data set
12, 12', 12" pixel
14, 14' column
16 row
18 block
22 pixel
24 pixel
G green pixel
R red pixel
B blue pixel
R predetermined order

The invention claimed is:

1. A method of compressing image data (10) that comprise a plurality of pixel values, each pixel value being associated with a respective pixel (12) of a plurality of pixels (12), wherein the pixels (12) are provided in an arrangement of rows (16) and columns (14), with each row (16) or column (14) corresponding to a pixel alignment having a predetermined order (R) of pixels (12),
wherein the pixel values for at least some of the plurality of pixels (12) are encoded in accordance with the following steps:
associating the respective pixel (12') with one of a plurality of pixel groups in accordance with a predetermined grouping scheme, with each of the plurality of pixel groups being defined by the pixels of a plurality of predetermined pixel alignments (14, a, u) or by a subset of pixels of a plurality of predetermined pixel alignments (14, a, u);
determining an estimated pixel value of the respective pixel (12') in dependence on the pixel value associated with at least one predetermined other pixel (12", 22, 24) while using at least one estimation rule, with the at least one predetermined other pixel (12", 22, 24) being selected in dependence on the pixel group of the respective pixel (12');
forming a difference value (D1, D2, D3) of the respective pixel (12) that corresponds to a predetermined relation between the pixel value associated with the respective pixel and the estimated pixel value of the respective pixel (12'); and
encoding the difference value (D1, D2, D3) using an encoding process.

2. A method in accordance with claim 1,
wherein the image data (10) comprise pixel values of different colors (R, G, B); and
wherein the pixel value of the respective pixel (12') and the pixel value of the at least one predetermined other pixel (12", 22, 24) correspond to the same color.

3. A method in accordance with claim 1,
wherein the plurality of pixel groups comprise at least one first pixel group and one second pixel group;
wherein, when the respective pixel (12') is associated with the first pixel group, the respective pixel (12') and the at least one predetermined other pixel (12") belong to the same pixel alignment (14); and wherein, when the respective pixel (12') is associated with the second pixel group, the step of determining an estimated pixel value is carried out in dependence on at least one of:
a plurality of predetermined other pixels (12", 22, 24) that belong to the same pixel alignment (14) as the respective pixel, and
a plurality of predetermined other pixels that belong to at least one other pixel alignment (14, 14") than that of the respective pixel.

4. A method in accordance with claim 3,
wherein the at least one other pixel alignment (14) is directly adjacent or indirectly adjacent to the pixel alignment (14, 14") of the respective pixel (12").

5. A method in accordance with claim 4,
wherein the at least one other pixel alignment (14, 14") is spaced apart from the pixel alignment (14) of the respective pixel (12') by a pixel alignment (14).

6. A method in accordance with claim 3,
wherein, when the respective pixel (12') is associated with the second pixel group, the at least one estimation rule provides the forming of a weighted sum on the basis of the pixel values of the plurality of predetermined other pixels (12", 22, 24).

7. A method in accordance with claim 6,
wherein the weighted sum is formed by a mean value of the pixel values of the plurality of predetermined other pixels (12", 22, 24).

8. A method in accordance with claim 3,
wherein, when the respective pixel (12') is associated with the first pixel group, the at least one estimation rule provides that the estimated pixel value is determined on the basis of a pixel value of a pixel (12") whose position within the pixel alignment (14) of the respective pixel (12') is before the position of the respective pixel (12') in accordance with the predetermined order.

9. A method in accordance with claim 3,
wherein the image data comprise pixel values of a first color (R), pixel values of a second color (G) and pixel values of a third color (B);
wherein the number of pixel values of the second color (G) for a respective image data set (10) is greater than the number of pixel values of the first color (R) and greater than the number of pixel values of the third color (B);
wherein the plurality of pixel groups comprise a third pixel group that is formed by a subset of pixels (12) of the plurality of predetermined pixel alignments (a, u); and
wherein the pixel values of the third pixel group comprise a first portion of the pixel values of the second color (G), and wherein the pixel values of the first pixel group and of the second pixel group comprise a second portion of the pixel values of the second color (G) and pixel values of the first color (R) and of the third color (B).

10. A method in accordance with claim 9,
wherein, when the respective pixel (12') is associated with the third pixel group, the step of determining an estimated pixel value is carried out in dependence on a plurality of predetermined other pixels (24) that belong to at least one pixel alignment (14) directly adjacent to the pixel alignment (14) of the respective pixel (12').

11. A method in accordance with claim 10,
wherein the at least one pixel alignment (14) comprises two pixel alignments (14) that are directly adjacent to the pixel alignment (14) of the respective pixel (12').

12. A method in accordance with claim 10,
wherein the at least one estimation rule provides the forming of a weighted sum on the basis of the pixel values of the plurality of predetermined other pixels (24).

13. A method in accordance with claim 3,
wherein the predetermined pixel alignments (a, u) of the first pixel group and of the second pixel group are defined alternatingly pairwise in the arrangement of pixels (12); and
wherein, when the respective pixel (12') is associated with the second pixel group, the plurality of predetermined other pixels (22) that belong to another pixel alignment (14") belong to the first pixel group.

14. A method in accordance with claim 3,
wherein, when the respective pixel (12') is associated with the second pixel group, at least one of the plurality of predetermined other pixels (12") belongs to the same pixel alignment (14) as the respective pixel (12') and has a position within the pixel alignment (14) of the respective pixel (12') that is before the position of the respective pixel (12') in accordance with the predetermined order (R).

15. A method in accordance with claim 1,
wherein the pixel values of pixels (12') of different pixel alignments (14) are at least partly encoded in parallel.

16. A method in accordance with claim 1,
wherein the pixel values of pixels (12') that belong to the same pixel alignment (14) are at least partly compressed in parallel between the plurality of pixel groups.

17. A method in accordance with claim 1,
wherein the pixel values of pixels (12') that belong to the same pixel group and to the same pixel alignment (14) are at least partly compressed in the predetermined order (R) of the pixel alignment (14).

18. A method in accordance with claim 1,
wherein the pixel values of pixels (12') of one of the plurality of pixel groups are compressed before the pixel values of pixels of a different one of the plurality of pixel groups.

19. A method in accordance with claim 1,
wherein the pixels (12, 12') of the plurality of predetermined pixel alignments (14) are divided into a plurality of pixel strips transversely to the pixel alignments, with the pixel values of pixels (12') between the pixel strips being at least partly compressed in parallel.

20. A method in accordance with claim 1,
wherein the respective step of associating the respective pixel (12') with one of a plurality of pixel groups is carried out in common for a plurality of the at least some pixels (12') before the respective step of determining an estimated pixel value of the respective pixel (12') is carried out for this plurality of pixels; or
wherein the step of associating the respective pixel (12') with one of a plurality of pixel groups is carried out separately for each of the at least some pixels.

21. A method in accordance with claim 1,
wherein the plurality of predetermined pixel groups exclusively correspond to columns (14).

22. A method in accordance with claim 1,
wherein the difference values (D1, D2, D3) are encoded in accordance with a Golomb-Rice encoding process.

23. A method in accordance with claim 22,
wherein a difference value (D) to be encoded is divided by an encoding parameter (k) to determine a whole number quotient (B) and a remainder (A), with the remainder (A) being represented by a first binary word and the whole number quotient (B) being represented by a second binary word, and with the first binary word and the second binary word being concatenated with one another; and wherein, when a predetermined relation between the whole number quotient and the encoding parameter does not infringe a predetermined marginal condition, the concatenated binary word is concatenated with an encoding information bit to indicate the end of the concatenated binary word, with the concatenated binary word otherwise not being concatenated with the encoding information bit.

24. A computer program product embodied on non-transitory computer readable memory operatively connected to one or more processors, wherein the computer program product comprises commands that, when executed by the one or more processors, cause the one or more processors to carry out the method in accordance with claim 1.

25. A non-transitory computer readable memory medium storing commands that, on execution by a computer, cause the computer to carry out the method in accordance with claim 1.

26. An apparatus having a non-transitory computer readable memory medium in accordance with claim 25 and having a computing device, wherein the computing device is adapted to execute the commands stored on the non-transitory computer readable memory medium.

27. An apparatus in accordance with claim 26, wherein the computing device has at least one graphics processor and/or is connected to at least one graphics processor.

28. A motion picture camera that is configured for recording a time sequence of frames and to compress at least one of the frames in accordance with the method of claim 1.

* * * * *